(12) United States Patent
Chen et al.

(10) Patent No.: US 7,647,635 B2
(45) Date of Patent: Jan. 12, 2010

(54) SYSTEM AND METHOD TO RESOLVE AN IDENTITY INTERACTIVELY

(75) Inventors: Lee Chen, Saratoga, CA (US); John Chiong, San Jose, CA (US); Philip Kwan, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 165 days.

(21) Appl. No.: 11/592,473

(22) Filed: Nov. 2, 2006

(65) Prior Publication Data

US 2008/0109887 A1 May 8, 2008

(51) Int. Cl.
*G06F 11/30* (2006.01)
*G06F 15/173* (2006.01)

(52) U.S. Cl. .............................. 726/23; 726/25; 709/24

(58) Field of Classification Search .................. 726/23; 709/224

See application file for complete search history.

(56) References Cited

U.S. PATENT DOCUMENTS

| | | | |
|---|---|---|---|
| 6,714,931 B1* | 3/2004 | Papierniak et al. ............ 707/10 |
| 7,237,267 B2* | 6/2007 | Rayes et al. .................. 726/25 |
| 2005/0086502 A1* | 4/2005 | Rayes et al. ................ 713/189 |
| 2005/0204162 A1* | 9/2005 | Rayes et al. ................ 713/201 |
| 2005/0283609 A1* | 12/2005 | Langford .................... 713/176 |
| 2008/0104276 A1* | 5/2008 | Lahoti et al. ................ 709/245 |

* cited by examiner

*Primary Examiner*—Christian LaForgia
(74) *Attorney, Agent, or Firm*—North Shore Patents, P.C.; Michele Liu Baillie (57) ABSTRACT

A system and method for resolving an identity includes a security console, which displays security information regarding a secure network. The security information includes at least a first identity used to access the secure network. An operator selects the first identity, and the security console sends it to a resolver. The resolver connects with an identity server to find an access session record with an identity matching the first identity. A second identity is extracted from this record, and the resolver returns a result that includes the second identity. The security console displays the second identity; The first identity can be a user identity of a user, where the second identity is corresponding host identity, or vise versa. In this manner, an efficient interface to security information is provided to an operator, where the operator may resolve a user/host identity to a host/user identity interactively.

27 Claims, 6 Drawing Sheets

SYSTEM AND METHOD TO RESOLVE AN IDENTITY INTERACTIVELY

BACKGROUND

1. Field

This invention relates generally to data networking, and more specifically, to a system and method to interactively resolve an identity.

2. Related Art

The secure data network of a company is a critical component for day-to-day functioning of company business activities. A company employee uses a host device, such as a desktop personal computer, a laptop personal computer, a personal data assistant (PDA), a workstation, or a smartphone to access the secure data network for communication within the company and with the outside world. An employee typically accesses the secure data network after a successful log-on process, using an employee name or an employee identity.

Information about an employee's access to the secure data network is recorded in the secure data network, such as in an identity server, an authentication server, or an identity management system. The information associates an employee identity with an identity of the host device used for the secure data network access, such as an Internet Protocol (IP) address or a Media Access Control (MAC) address.

Security data network also records network activities of the host device in the form of event logs, security alerts, network performance reports, or security monitor records. Information technologies (IT) staff supporting the security data network often have to plow through a large volume of such information to troubleshoot security instances, such as security breaches, suspicious network activities or employee complaints. Oftentimes, IT staff has to discover the owner of a host device, or the employee who is using the host device at the time of the security instance in order to troubleshoot a security instance.

In one example, IT support engineer Eddie receives a security alert, flagging a suspected malicious attack to the secure data network from a host device. The security alert includes an Internet Protocol (IP) address of the host device. In order to contact the employee using the host device for remedial action, Eddie first queries a Dynamic Host Control Protocol (DHCP) server to find a device identity such as a Media Access Control (MAC) address of the host device. In one scenario, Eddie queries a directory server, or an identity server to find the employee who is using the host device. In another scenario, Eddie checks an inventory record, such as an inventory database, a spreadsheet or a hard copy list to find the employee or the department who owns the host device. This largely manual process unfortunately, takes minutes if not hours to complete. This not only hampers Eddie's ability to solve other security issues, but may also spell lost opportunity to come up with a timely remedial solution for the security instance.

In another example, while monitoring the secure data network, Eddie notices unusual confidential document retrieval activities associated with an employee name "Maria Vista". Eddie manually queries an identity server for security network access information, and finds that "Maria Vista" has accessed secure data network using three different devices in the past 2 hours. Alarmed, Eddie manually looks up inventory database and other network configuration information to locate the devices. This slow process causes unacceptable delay, and by the time Eddie sends a security guard to investigate, the alleged perpetrator is nowhere to be found.

Accordingly, there is a need for a system and method to allow an IT personnel to interactively resolve a host device identity to an employee identity, and vice versa. This invention addresses such a need.

SUMMARY

A system and method for resolving an identity includes a security console, which displays security information regarding a secure network. The security information includes at least a first identity used to access the secure network. An operator selects the first identity, and the security console sends it to a resolver. The resolver connects with an identity server to find an access session record with an identity matching the first identity. A second identity is extracted from this record, and the resolver returns a result that includes the second identity. The security console displays the second identity. The first identity can be a user identity of a user, where the second identity is corresponding host identity, or vise versa. In this manner, an efficient interface to security information is provided to an operator, where the operator may resolve a user/host identity to a host/user identity interactively.

DETAILED DESCRIPTION

Figure 1A:
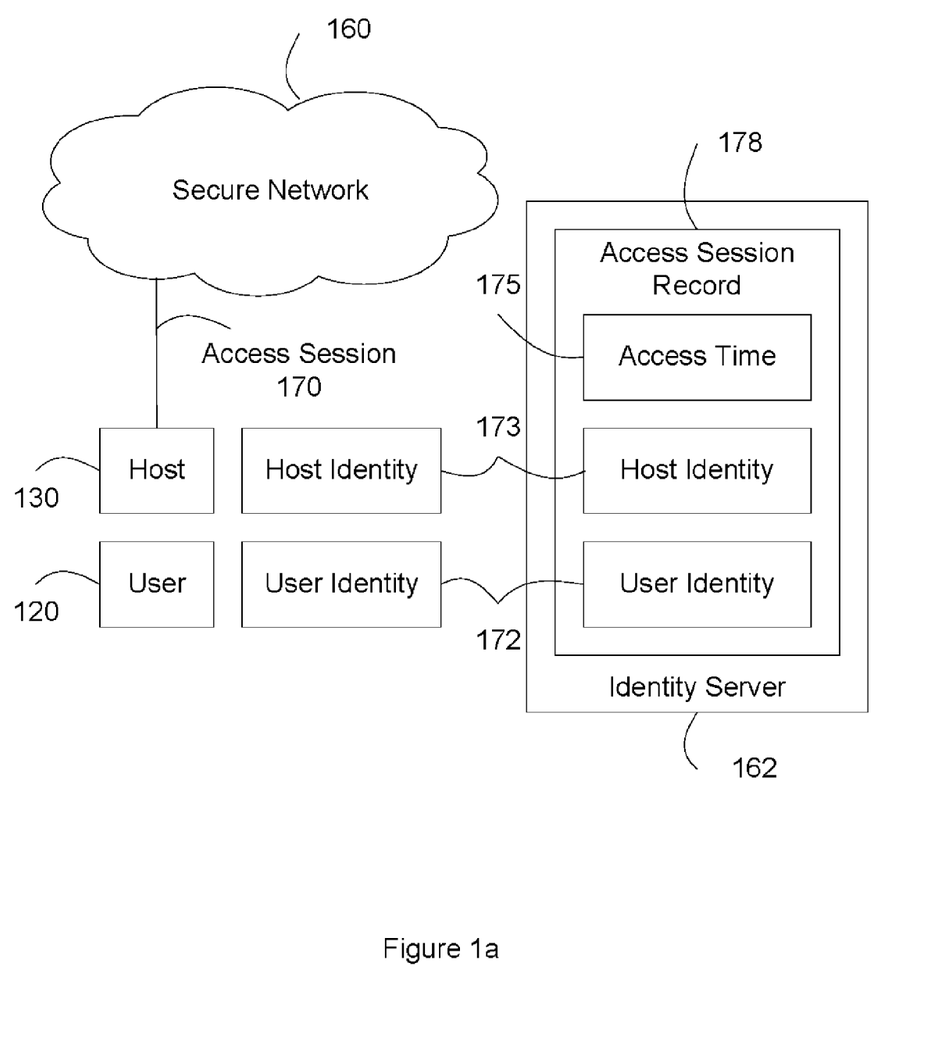
FIG. 1a illustrates a secure network.

FIG. 1a illustrates a secure network. A secure network 160 includes a host 130. A user 120 uses host 130 to access secure network 160.

In one embodiment, secure network 160 includes a data network based on an Internet Protocol (IP). In one embodiment, secure network 160 includes a wired Local Area Network (LAN) such as an Ethernet. In one embodiment, secure network 160 includes a Wireless Local Area Network (WLAN). In one embodiment, secure network 160 includes a Wide Area Network (WAN). In one embodiment, secure network 160 includes a public data network, such as a WiFi hotspot network, or a cellular data network such as General Packet Radio Service (GPRS) network. In one embodiment, secure network 160 includes a private data network such as a home network, a corporate network, a regional corporate network or a corporate Virtual Private Network (VPN). In one embodiment, secure network 160 includes a service provider network.

Host 130 is a computing device with network access capabilities. In one embodiment, host 130 is a desktop personal computer or a laptop personal computer. In one embodiment, host 130 is a Personal Data Assistant (PDA), a smartphone, or a cellular phone.

Typically, user 120 uses host 130 to access secure network 160 over an access session 170 for some duration. During access session 170, user 120 assumes a user identity 172 and host 130 assumes a host identity 173. User identity 172 corresponds to host identity 173 for the access session 170.

In one embodiment, user identity 172 includes a user name, a subscriber name, or an employee number. In one embodiment, user identity 172 includes a telephone number, an extension number, or an email address.

In one embodiment, host identity 173 includes an Internet Protocol (IP) address. In one embodiment, host identity 173 includes a Media Access Control (MAC) address. In one embodiment, host identity 173 includes a host name. In one embodiment, host identity 173 includes an International Mobile Subscriber Identity (IMSI), a Temporary Mobile Subscriber Identity (TMSI), or an International Mobile Equipment Identity (IMEI), or a Mobile Equipment Identifier (MEID).

Access session record 178 records information about access session 170. Access session record 178 includes user identity 172 and host identity 173. In one embodiment, access session record 178 includes access time 175. Access time 175 records the time of the access session 170. In one embodiment, access time 175 includes a time stamp of the starting time of access session 170. In one embodiment, access time 175 includes a time stamp of the ending time of access session 170.

Identity server 162 stores access session record 178. In one embodiment, identity server 162 creates access session record 178 at the starting time of access session 170. In another embodiment, identity server 162 creates access session record 178 after the ending time of access session 170. In an embodiment, identity server 162 creates access session record 178 during access session 170. Identity server 162 may record access time 175 during or after access session 170.

Figure 1B:
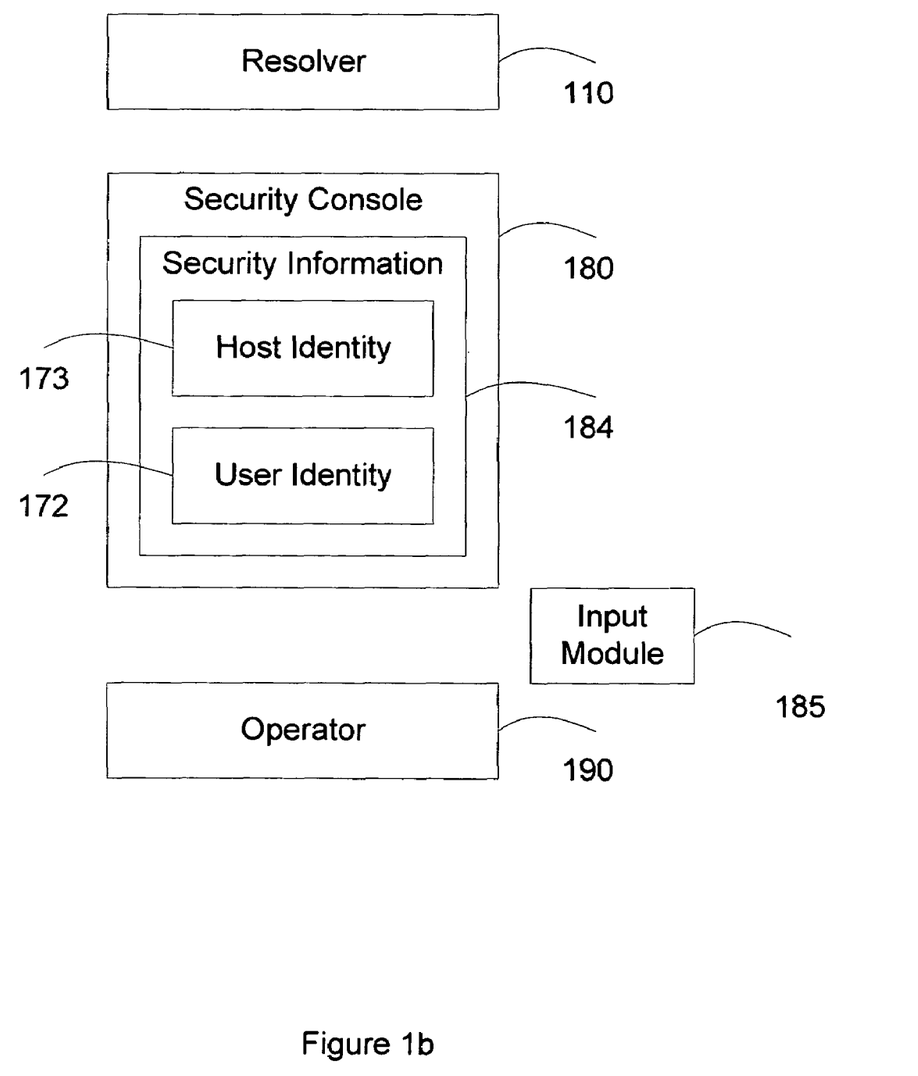
FIG. 1b illustrates a security console and a resolver.

FIG. 1b illustrates a security console and a resolver.

Security console 180 is a software application presenting security information 184 about secure network 160. Resolver 110 is a software program associated with security console 180.

Security console 180 runs on a computing device with a display screen. The computing device can be a server, a workstation, a desktop personal computer, a laptop personal computer, a Personal Data Assistant (PDA), or a smartphone. Security console 180 presents security information 184 about secure network 160 on the display screen.

In one embodiment security information 184 is an event log, a security alert, a network report, a result of a security query, a network performance summary, a security monitoring record, or a historical network usage report. In one embodiment, security console 180 includes a browser.

An operator 190 uses security console 180 to interactively monitor secure network 160. In one embodiment, the computing device provides input module 185 such as a mouse, a pointing device, a stylus or a touchscreen for operator 190 to interact with security console 180.

In one embodiment, security console 180 presents user identity 172. Operator 190 uses input module 185 to select user identity 172 and invokes resolver 110 to resolve user identity 172. In one embodiment, resolver I 10 resolves user identity 172 to host identity 173. In one embodiment, resolver 110 resolves user identity 172 to access session record 178.

In one embodiment, operator 190 selects user identity 172 by using the mouse to highlight user identity 172. In one embodiment, operator 190 selects user identity 172 by placing the mouse over user identity 172.

In another embodiment, security console 180 presents host identity 173. Operator 190 uses input module 185 to select host identity 173 and invokes resolver 110 to resolve host identity 173 to user identity 172. In one embodiment, resolver 110 resolves host identity 173 to access session record 178.

Figure 2A:
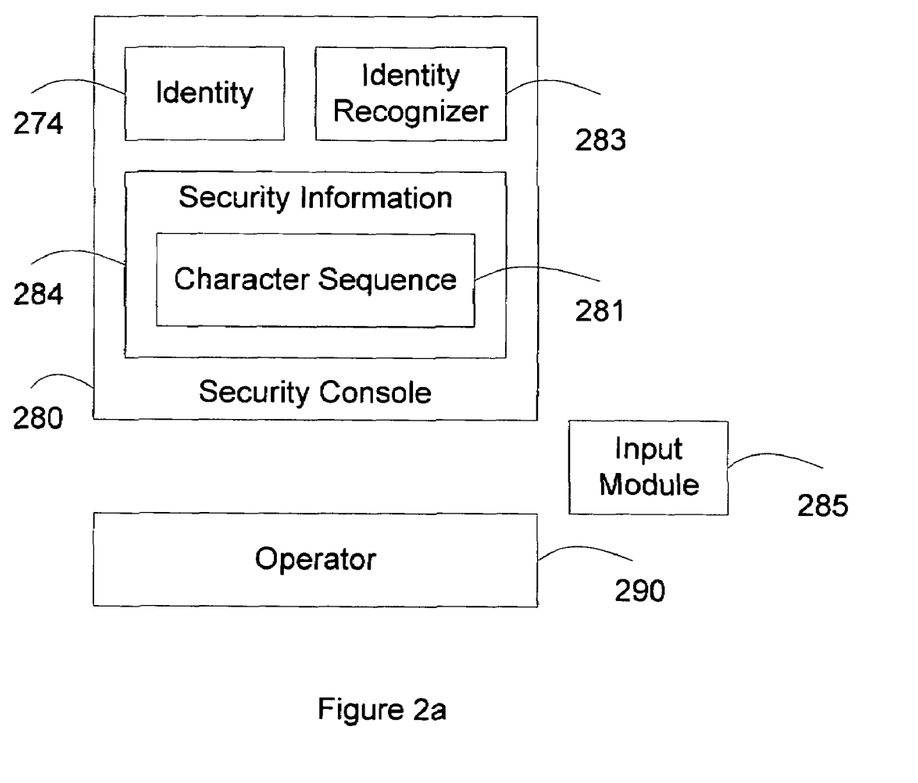
FIG. 2a illustrates a process for an operator to select an identity.

FIG. 2a illustrates a process for an operator to select an identity.

Operator 290 selects a character sequence 281 in security information 284 displayed on security console 280.

In one embodiment, operator 290 highlights character sequence 281 using input module 285. In one embodiment, operator 290 highlights by indicating the first character and the last character of character sequence 281. In one embodiment, operator 290 indicates the first character by clicking a mouse button of input module 285 at a location before the first character. Likewise, operator 290 indicates the last character by clicking a mouse button of input module 285 at a location after the last character. In one embodiment, character sequence 281 is a word or a sequence of words. In one embodiment, operator 290 highlights the word by double clicking a mouse button of input module 285.

In one embodiment, security console 280 includes identity recognizer 283. Identity recognizer 283 analyzes character sequence 281 to determine identity 274. In one embodiment, identity recognizer 283 recognizes a string of four numbers separated by periods such as "172.168.0.105" in character sequence 281. Identity recognizer 283 determines identity 274 to be a host identity as an IP address. In one embodiment, identity recognizer 283 recognizes a string of six two-digit hexadecimal numbers separated by hyphens or colons such as "00-08-74-4C-7F-1D" or "01:23:45:6C:89:AB" in character sequence 281. Identity recognizer 283 determines identity 274 to be a host identity as an Ethernet MAC address.

In one embodiment, identity recognizer 283 recognizes character sequence 281 as one or more words such as "John Smith". Identity recognizer 283 determines identity 274 to be a user identity as a user name. In one embodiment, identity recognizer 283 recognizes character sequence 281 as one or more digits such as "0239581". Identity recognizer 283 determines identity 274 to be a user identity as an employee number. In one more embodiment, identity recognizer 283 recognizes character sequence 281 as one word that includes an "@" character such as "johnsmith@goldenbank.com". Identity recognizer 283 determines identity 274 to be a user identity as an email address.

Figure 2B:
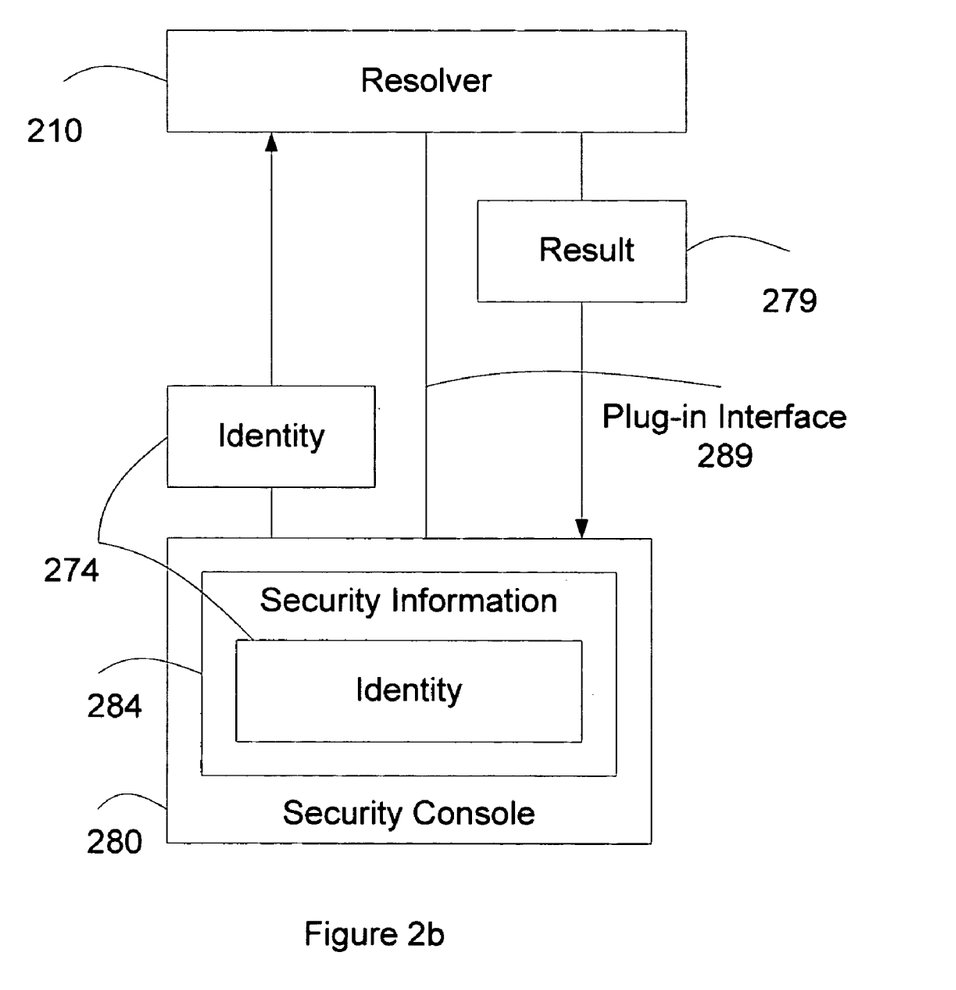
FIG. 2b illustrates a process for security console to invoke resolver.

FIG. 2b illustrates a process for security console to invoke resolver.

In one embodiment, security console 280 includes a browser such as INTERNET EXPLORER, FIREFOX, NETSCAPE, SAFARI or OPERA. In one embodiment, security console 280 includes a text editor. In one embodiment, security console 280 includes a network management application, a network monitor application, a network security management application, a network performance monitor application.

Security console 280 connects to resolver 210 over a plug-in interface 289.

In one embodiment, plug-in interface 289 is an ActiveX Control Application Programming Interface (API). In one embodiment, plug-in interface 289 is based on Component Object Model (COM) or Distributed Component Object Model (DCOM). In one embodiment, plug-in interface 289 is based on Object Linking and Embedding (OLE) technology. In one embodiment, plug-in interface 289 is based on Firefox extension system. In one embodiment, plug-in interface 289 is based on Java applets technology.

Security console 280 sends identity 274 to resolver 210 over plug-in interface 289.

Security console 280 receives result 279 from resolver 210 over plug-in interface 289. In one embodiment, identity 274 is a first host identity. In one embodiment, result 279 includes a first user identity that corresponds to the first host identity. In one embodiment, result 279 includes a first access session record. In another embodiment, identity 274 is a second user identity. In one embodiment, result 279 includes a second host identity that corresponds to the second user identity. In one embodiment, result 279 includes a second access session record.

In one embodiment, security console 280 formats and displays result 279 on the display screen. In one embodiment, security console 280 displays result 279 in a dialog box next to identity 274 in the displayed security information 284. In one embodiment, security console 280 reformats and displays security information 284 by including result 279 as part of security information 284.

Figure 2C:
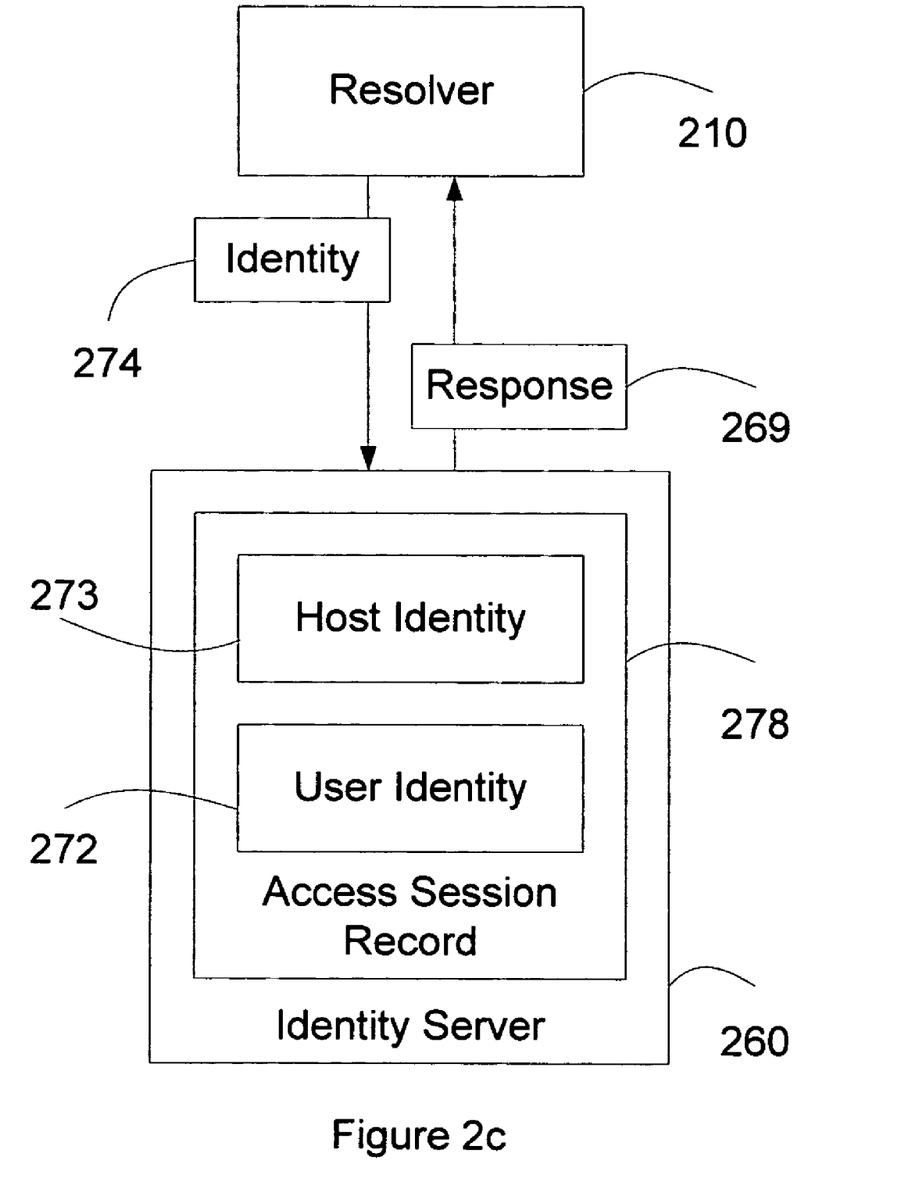
FIG. 2c illustrates an identity resolution process.

FIG. 2c illustrates an identity resolution process.

Resolver 210 receives identity 274 from security console 280 as illustrated in FIG. 2b. Resolver 210 resolves identity 274 in conjunction with an identity server 260.

Identity server 260 stores a plurality of access session records. The plurality of access session records includes access session record 278.

Resolver 210 connects to identity server 260. In one embodiment, resolver 210 connects to identity server 260 over a data network. In one embodiment, the data network is an IP network. In one embodiment, the data network is secure network.

In one embodiment, resolver 210 connects to identity server 260 using Hypertext Transfer Protocol (HTTP). In one embodiment, resolver 210 connects to identity server 260 using Simple Object Access Protocol (SOAP), Simple Network Management Protocol (SNMP), Remote Method Invocation (RMI), Remote Procedure Call (RPC), or Light Weight Directory Access Protocol (LDAP). In one embodiment, resolver 210 connects to identity server 260 using a database connectivity API such as Open Database Connectivity (ODBC) API or Java Database Connectivity (JDBC) API. In one embodiment, resolver 210 connects to identity server 260 using a proprietary protocol.

Resolver 210 sends identity 274 to identity server 260. In one embodiment, identity 274 is host identity 273. Identity server 260 selects access session record 278 with matching host identity 273. Identity server 260 extracts user identity 272 from access session record 278, and includes user identity 272 in response 269. In one embodiment, identity server 260 includes access session record 278 in response 269.

In another embodiment, identity 274 is user identity 272. Identity server 260 selects access session record 278 with matching user identity 272. Identity server 260 extracts host identity 273 from access session record 278, and includes host identity 273 in response 269. In one embodiment, identity server 260 includes access session record 278 in response 269.

Identity server 260 sends response 269 to resolver 210, completing the resolution process.

In one embodiment, resolver 210 sends response 269 to security console 280 as result 279 as illustrated in FIG. 2b.

Figure 2D:
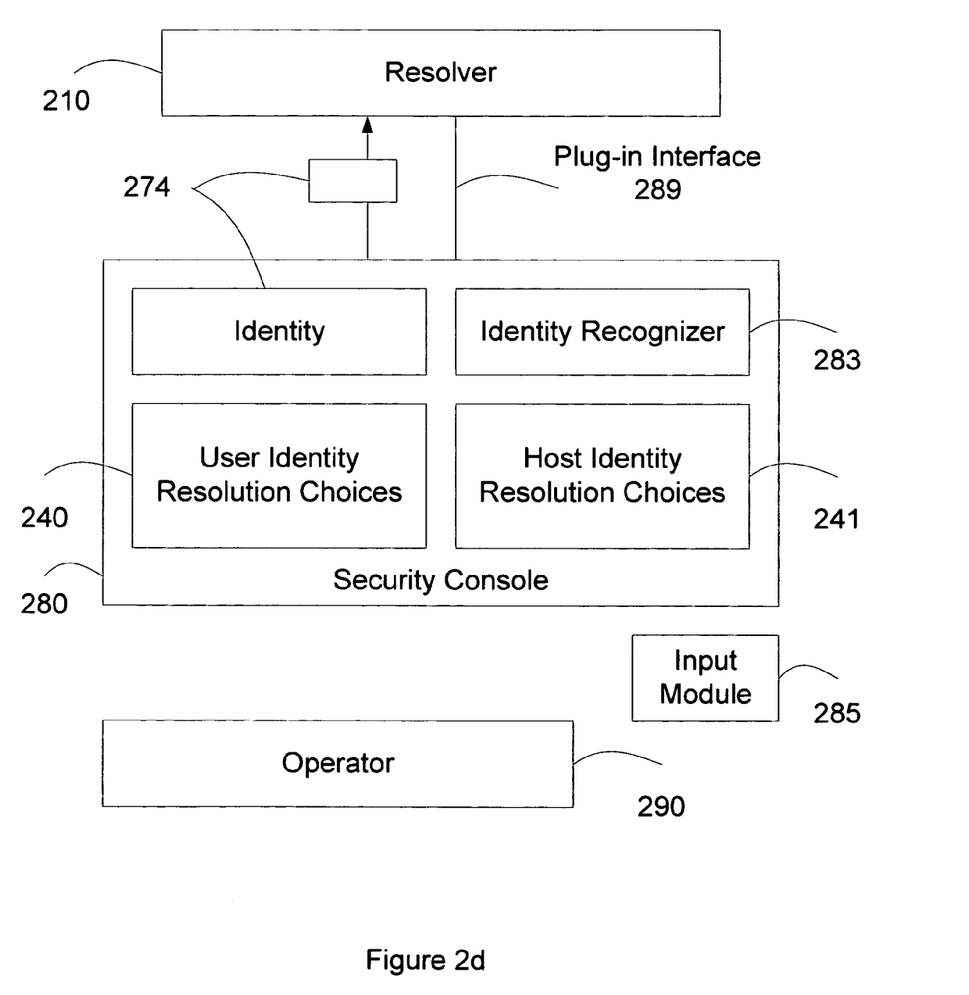
FIG. 2d illustrates identity resolution choices.

FIG. 2d illustrates identity resolution choices.

Security console 280 presents resolution choices to operator 290 based on identity 274.

In one embodiment, security console 280 recognizes that identity 274 is a user identity. Security console 280 presents to operator 290 a plurality of user identity resolution choices 240. In one embodiment, user identity resolution choices 240 include host identity, access session record, or access history. In one embodiment, security console 280 presents user identity resolution choices 240 in a drop-down selection menu on the display screen.

Operator 290 uses input module 285 to select from user identity resolution choices 240. In one embodiment, operator 290 selects the access session record choice. Security console 280 sends identity 274 to resolver 210 over plug-in interface 289, requesting resolution from user identity to access session record.

In a similar fashion, security console 280 recognizes that security 274 is a host identity. Security console 280 presents to operator 290 a plurality of host identity resolution choices 241. In one embodiment, host identity resolution choices 241 include user identity, access session record, or access history.

In one embodiment, operator 290 uses input module to point to a character in security information 284 displayed on security console 280. In one embodiment, operator 290 uses the mouse to point to the character. In one embodiment, operator 290 uses a stylus to point to the character. Identity recognizer 283 recognizes an identity 274 in a sequence of characters that includes the character. In one embodiment, the sequence of characters is delimited by a pair of white-space characters, such as character return, line-feed, or space characters. In one embodiment, the sequence of characters includes multiple words. In one embodiment, the sequence of characters is delimited by a pair of matching tags, such as Extended Markup Language (XML) tags or Hypertext Markup Language (HTTP) tags.

In one embodiment, security console 280 automatically recognizes an identity 274 in security information 284. In one embodiment, identity recognizer 283 automatically scans security information 284 to recognize identity 274. Security console 280 sends the identity 274 to resolver 210. In one embodiment, identity recognizer 283 matched the recognized identity 274 against a list of identities. Security console 280 sends the matched identity 274 to resolver 210.

In one embodiment, identity recognizer 283 automatically recognizes a plurality of identities. Security console 280 sends the plurality of identities to resolver 210.

In one embodiment, resolver 210 includes identity recognizer 283. Security console 280 sends character sequence to resolver 210 over plug-in interface 289. Resolver 210 invokes identity recognizer 283 to recognize identity 274 in character sequence 281. In one embodiment, resolver 210 indicates to security console 280 the recognition of a user identity in character sequence 281; security console 280 presents user identity resolution choices 240 to operator. In a similar fashion, resolver 210 indicates to security console 280 the recognition of a host identity in character sequence 281; security console 280 presents host identity resolution choices 241 to operator 290.

In one embodiment, the resolution is based on time. Resolver 210 sends time information to identity server 260 together with identity 274. Identity server 260 selects an access session record 278 with access time matching the time information.

In one embodiment, after operator 290 selects identity 274, security console 280 prompts operator 290 to enter time information. Security console 280 obtains time information from operator 290. In one embodiment, security console 280 obtains time information from a clock that indicates time of day. Security console 280 sends time information together with identity 274 to resolver 210.

In one embodiment, access session record 278 includes additional user information, such as office or cubicle number or location, building number or location, telephone number, department name or email address. In one embodiment, host identity resolution choices 241 include additional user information choice. In one embodiment, access session record includes additional host information, such as host device type, host device location, network access point identity, or device owner information. In one embodiment, user identity resolution choices 240 include additional host information choice.

In one embodiment, security console stores result in a document. In one embodiment, security console stores result in response to operator input.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for resolving an identity used to access a secure network, comprising the steps of:
   (a) providing a security console for displaying security information regarding a secure network, wherein the security information comprises a sequence of characters;
   (b) receiving a selection of a subset of characters in the sequence from an operator;
   (c) automatically recognizing a plurality of host identities from the selected subset of characters;
   (d) sending the plurality of host identities to a resolver;
   (e) selecting by the resolver a plurality of access session records, each access session record comprising a host identity matching at least one of the plurality of host identities;
   (f) extracting by the resolver a plurality of user identities, used during an access session for accessing the secure network, from the selected plurality of access session records;
   (g) receiving from the resolver the plurality of user identities; and
   (h) displaying the plurality of user identities.

2. The method of claim 1, wherein the providing (a) comprises:
   (a1) creating the plurality of access session records, each access session record comprising a given user identity of a given user used during the access session for accessing the secure network, and a given host identity of a given host used by the given user during the access session to access the secure network.

3. The method of claim 2, wherein the user identity is a user name.

4. The method of claim 1, wherein the automatically recognizing (c), sending (d), extracting (f), receiving (g), and displaying (h) further comprises:
   (c1) displaying a plurality of host identity resolution choices;
   (c2) receiving a selection of one of the plurality of host identity resolution choices;
   (d1) sending the plurality of host identities and the selected host identity resolution choice to the resolver;
   (f1) extracting by the resolver other information from the selected plurality of access session records based on the selected host identity resolution choice;
   (g1) receiving from the resolver the plurality of user identities and the other information; and
   (h1) displaying the plurality of user identities and the other information.

5. The method of claim 4, wherein the plurality of host identity resolution choices comprise an access session record choice, or an access history choice.

6. The method of claim 5, wherein each of the plurality of access session records comprises additional user information, wherein the plurality of host identity resolution choices further comprise choices based on the additional user information.

7. The method of claim 1, wherein the selecting (e) comprises:
   (e1) receiving the plurality of host identities by the resolver;
   (e2) sending the plurality of host identities from the resolver to an identity server, wherein the identity server stores the plurality of access session records; and
   (e3) selecting by the identity server the plurality of access session records comprising the host identity matching at least one of the plurality of host identities.

8. The method of claim 7, wherein the extracting (f) comprises:
   (f1) extracting by the identity server the plurality of user identities from the selected plurality of access session records; and
   (f2) sending by the identity server the plurality of user identities to the resolver.

9. The method of claim 8, wherein the identity server further sends the selected plurality of access session records to the resolver.

10. The method of claim 1, wherein the sending (d) and selecting (e) further comprises:
    (d1) obtaining a time information for the access session;
    (d2) sending the plurality of host identities and the time information to the resolver; and
    e(1) selecting by the resolver the plurality of access session records, each access session record comprising the host identity matching at least one of the plurality of host identities and an access time corresponding to the access session on the secure network, the access time comprising a starting time of the access session and an ending time for the access session.

11. The method of claim 1, wherein the receiving (b) comprises:
    b(1) determining that the subset of characters in the sequence is selected based on a pointer position on the display.

12. The method of claim 1, wherein the automatically recognizing (c) comprises:
    c(1) automatically recognizing the plurality of host identities in a pattern of the sequence of characters that include the selected subset of characters, wherein the pattern comprises periods.

13. The method of claim 1, wherein the automatically recognizing (c) comprises:
    c(1) automatically recognizing the plurality of host identities in a pattern of the sequence of characters that include the selected subset of characters, wherein the pattern comprises colons or hyphens.

14. A computer readable storage medium with program instructions for resolving an identity used to access a secure network, comprising the instructions for:
    (a) providing a security console for displaying security information regarding a secure network, wherein the security information comprises a sequence of characters;
    (b) receiving a selection of a subset of characters in the sequence from an operator;
    (c) automatically recognizing a plurality of host identities from the selected subset of characters;
    (d) sending the plurality of host identities to a resolver;
    (e) selecting by the resolver a plurality of a plurality of access session records, each access session record comprising a host identity matching at least one of the plurality of host identities;

(f) extracting by the resolver a plurality of user identities, used during an access session for accessing the secure network, from the selected plurality of access session records;
(g) receiving from the resolver the plurality of user identities; and
(h) displaying the plurality of user identities.

15. A method for resolving an identity used to access a secure network, comprising the steps of:
(a) providing a security console for displaying on a display security information regarding a secure network, wherein the security information comprises a sequence of characters;
(b) receiving a selection of a subset of characters in the sequence from an operator;
(c) automatically recognizing a plurality of user identities from the selected subset of characters;
(d) sending the plurality of user identities to a resolver;
(e) selecting by the resolver a plurality of access session records, each access session record comprising a user identity matching at least one of the plurality of user identities;
(f) extracting by the resolver a plurality of host identities, used by users during an access session for accessing the secure network, from the selected plurality of access session records;
(g) receiving from the resolver the plurality of host identities; and
(h) displaying the plurality of host identities.

16. The method of claim 15, wherein the providing (a) comprises:
(a1) creating the plurality of access session records, each access session record comprising a given host identity of a given host used by a given user during the access session to access the secure network, and a given user identity of the given user.

17. The method of claim 16, wherein the user identity is a user name.

18. The method of claim 15, wherein the automatically recognizing (c), sending (d), extracting (f), receiving (g), and displaying (h) further comprises:
(c1) displaying a plurality of user identity resolution choices;
(c2) receiving a selection of one of the plurality of user identity resolution choices;
(d1) sending the plurality of user identities and the selected user identity resolution choice to the resolver;
(f1) extracting by the resolver other information from the selected plurality of access session records based on the selected user identity resolution choice;
(g1) receiving from the resolver the plurality of host identities and the other information; and
(h1) displaying the plurality of host identities and the other information.

19. The method of claim 18, wherein the plurality of user identity resolution choices comprise, an access session record choice or an access history choice.

20. The method of claim 19, wherein each of the plurality of access session records comprises additional host information, wherein the plurality of user identity resolution choices further comprise choices based on the additional host information.

21. The method of claim 15, wherein the selecting (e) comprises:
(e1) receiving the plurality of user identities by the resolver;
(e2) sending the plurality of user identities from the resolver to an identity server, wherein the identity server stores the plurality of access session records; and
(e3) selecting by the identity server the plurality of access session records comprising the user identity matching at least one of the plurality of user identities.

22. The method of claim 21, wherein the extracting (f) comprises:
(f1) extracting by the identity server the plurality of host identities from the selected plurality of access session records; and
(f2) sending by the identity server the plurality of host identities to the resolver.

23. The method of claim 22, wherein the identity server further sends the selected plurality of access session records to the resolver.

24. The method of claim 15, wherein the sending (d) and selecting (e) further comprises:
(d1) obtaining a time information for the access session;
(d2) sending the plurality of user identities and the time information to the resolver; and
(e1) selecting by the resolver the plurality of access session records, each access session record comprising the user identity matching at least one of the plurality of user identities and an access time corresponding to the access session on the secure network, the access time comprising a starting time of the access session and an ending time for the access session.

25. The method of claim 15, wherein the receiving (b) comprises:
(b1) determining that the subset of characters in the sequence is selected based on a pointer position on the display.

26. A computer readable storage medium with program instructions for resolving an identity used to access a secure network, comprising the instructions for:
(a) providing a security console for displaying on a display security information regarding a secure network, wherein the security information comprises a sequence of characters;
(b) receiving a selection of a subset of characters in the sequence from an operator;
(c) automatically recognizing a plurality of user identities from the selected subset of characters;
(d) sending the plurality of user identities to a resolver;
(e) selecting by the resolver a plurality of access session records, each access session record comprising a user identity matching at least one of the plurality of user identities;
(f) extracting by the resolver a plurality of host identities, used by users during an access session for accessing the secure network, from the selected plurality of access session records;
(g) receiving from the resolver the plurality of host identities; and
(h) displaying the plurality of host identities.

27. The method of claim 15, wherein the automatically recognizing (c) comprises:
(c1) automatically recognizing the plurality of user identities in a pattern of the sequence of characters that includes the selected subset of characters, wherein the pattern comprises one or more words separated by a space character.

* * * * *